United States Patent
Chang et al.

(10) Patent No.: US 6,326,740 B1
(45) Date of Patent: *Dec. 4, 2001

(54) HIGH FREQUENCY ELECTRONIC BALLAST FOR MULTIPLE LAMP INDEPENDENT OPERATION

(75) Inventors: Chin Chang, Yorktown Heights; Gert W. Bruning, Sleepy Hollow, both of NY (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,556

(22) Filed: Dec. 22, 1998

(51) Int. Cl.$^7$ ........................................................ G05F 1/00
(52) U.S. Cl. ...................... 315/291; 315/194; 315/224; 315/244; 315/209 R; 315/DIG. 7
(58) Field of Search .................................. 315/194, 291, 315/209 R, 307, 224, 244, 221, 231, 94, 105–107, DIG. 4, DIG. 5, DIG. 7

(56) References Cited

U.S. PATENT DOCUMENTS

| | | | |
|---|---|---|---|
| 4,207,497 | * | 6/1980 | Capewell et al. ........................ 315/96 |
| 4,277,728 | | 7/1981 | Stevens .................................. 315/307 |
| 4,535,399 | | 8/1985 | Szepesi ................................... 363/41 |
| 5,075,599 | | 12/1991 | Overgoor et al. .................... 315/224 |
| 5,394,064 | | 2/1995 | Ranganath et al. .................. 315/209 |
| 5,438,243 | | 8/1995 | Kong ..................................... 315/219 |
| 5,512,801 | * | 4/1996 | Nilssen ............................... 315/209 R |
| 5,519,289 | | 5/1996 | Katyl et al. ........................... 315/224 |
| 5,872,429 | * | 2/1999 | Xia et al. .............................. 315/194 |
| 5,973,455 | * | 10/1999 | Mirskiy et al. ....................... 315/105 |
| 6,002,214 | | 12/1999 | Ribarich ............................... 315/307 |
| 6,008,593 | | 12/1999 | Ribarich ............................... 315/307 |

FOREIGN PATENT DOCUMENTS

| | | |
|---|---|---|
| 19805732 | 8/1998 | (DE) . |
| 19805733 | 8/1998 | (DE) . |
| WO 9908373 | 2/1999 | (WO) . |

\* cited by examiner

Primary Examiner—Haissa Philogene

(57) ABSTRACT

An electronic ballast with a voltage-fed, LC or LLC resonant inverter for multiple gas discharge lamp independent operation which maintains a substantially constant voltage to a lamp or lamps connected to the ballast even during a transition period when a lamp or lamps is ignited, extinguished, added or removed. The ballast includes a feedback loop that maintains a substantially constant phase angle between the voltage and the current in an LC or LLC tank circuit, which has the effect of the ballast providing the substantially constant voltage output. The feedback loop obtains a current feedback signal and a voltage feedback signal from the tank circuit, and provides a phase shifted signal as a feedback correction signal which is the current feedback signal phase shifted by the voltage feedback signal that tracks phase angle changes with one, some or all of the lamps of a set thereof connected to the ballast, and during the transition period. The feedback loop includes a phase-shift circuit which includes at least one differential amplifier stage that receives the current feedback signal at both inputs and the voltage feedback signal at one input so as to phase shift the current feedback signal at that one input. The ballast operates instant start or rapid start gas discharge lamps in various configurations, including dimming configurations.

20 Claims, 9 Drawing Sheets

HIGH FREQUENCY ELECTRONIC BALLAST FOR MULTIPLE LAMP INDEPENDENT OPERATION

BACKGROUND OF THE INVENTION

This invention relates to an electronic ballast for driving a set of gas discharge lamps which is capable of driving the lamps independently of lamp loading, i.e., with less than all of the lamps in the set connected or operating, and in a transition period during which a lamp already connected stops or starts operating, or a during which a lamp is changed. Electronic ballasts may include a resonant inverter which is current-fed or voltage-fed. The invention herein relates to an electronic ballast with a voltage-fed resonant inverter.

Electronic ballasts that drive a set of gas discharge lamps should regulate the output to the lamps to drive the lamps with all, or less than all, of the lamps in the set operating or connected. Thus, if a lamp either degrades, stops lighting altogether or is disconnected, the ballast should continue to provide a satisfactory output to the remaining operating lamps. The same applies in a transition period during which a lamp already connected stops or starts operating and when a lamp is changed. It is highly desirable for a ballast to continue operating the remaining lamps connected thereto during a lamp change and to ignite a newly connected lamp so that it is not necessary to turn the power off to the ballast during lamp changing or to restart all of the lamps after a lamp change. Thus, electronic ballasts for multiple lamp operation advantageously should operate all connected lamps independently of lamp loading as indicated above. Such ballasts advantageously should also permit instant and/or rapid start operation.

An electronic ballast with a current-fed inverter requires a large, heavy inductor in series with the input of the inverter. Such ballasts are less affected by lamp loading due largely to the presence of the large input inductor, and are capable of multiple lamp operation independently of lamp loading, However, the large input inductor required by current-fed inverters increases the cost and the size and weight of the ballast.

U.S. Pat. No. 5,519,289 discloses an electronic ballast for multiple lamp operation with dimming, which includes a push-pull, self-oscillating inverter.

U.S. Pat. No. 5,438,243 discloses an electronic ballast for multiple independent lamp operation of instant start gas discharge lamps, which includes a quasi-voltage-fed half-bridge parallel resonant inverter, as shown in FIG. 2 of the patent. Intrinsically, the electronic ballast operates in current-fed parallel resonant mode where the current source is derived from an ideal voltage source in series with a first resonant tank circuit. In order to maintain a high voltage output for lamp starting, which requires a high Q, a second resonant circuit is provided. The electronic ballast circuit disclosed in this patent thus contains two cascaded resonant tanks. As a result, circuit losses and cost are increased. At the output, two ballast inductors are provided in series with two lamps and two ballast capacitors are provided in series with two other lamps, which reduces the reactive power requirement on the secondary side of the output transformer. However, this electronic ballast may impose a high voltage hazard across the output terminals when the lamps are removed while the circuit is hot. Other types of electronic ballast circuits with current-fed push-pull or half-bridge inverters for multiple florescent lamps are described at pages 583 and 584 of *Power Semiconductor Applications Handbook* 1995, Philips Semiconductor, 1994. In those configurations, each lamp is parallel connected to the output of a resonant inverter via a series ballast capacitor. The current source is usually obtained via a choke inductor in series with a voltage source. Good independent lamp operation is achieved via a constant relation between the output high frequency voltage and the input DC voltage. The disadvantages of this type of circuit include higher switch stresses and the added bulky choke inductor.

On the other hand, an electronic ballast with a voltage-fed resonant inverter, including well known half-bridge LC or LLC resonant inverters, do not require a large input inductor but are affected more by lamp loading, and thus require additional circuitry or resonant components in order to achieve multiple lamp independent operation.

U.S. Pat. Nos. 5,438,243, 5,394,064, 5,075,599 and 4,535,399 disclose electronic ballasts for multiple lamp independent operation which include voltage fed inverters. The electronic ballast described in U.S. Pat. No. 5,394,064, which permits dimming operation, includes a voltage-fed half-bridge resonant inverter which generates a high frequency square-wave voltage. Control is provided by varying the input voltage to the inverter or the inverter frequency, or both using voltage feedback from the input to the inverter and feedback from the lamp circuit to the oscillator driving the inverter switches. As shown in FIG. 1 of the patent, a transformer couples the lamps to the inverter, with each lamp being driven through an individual resonant tank circuit consisting of a series inductor and a parallel capacitor. The circuit for connecting the lamps may be considered as a parallel connection of multiple resonant tanks each loaded with a single lamp. Although multiple lamp operation is achieved, a large number of magnetic components and capacitors is required, which results in higher cost.

The electronic ballast described in U.S. Pat. No. 4,535,399 includes a voltage-fed resonant inverter and a separate resonant tank circuit for each lamp (FIG. 6). Each of the separate resonant tank circuits includes a small inductor and a capacitor, which adds to the cost of the ballast. This ballast also includes a current feedback loop which controls switching of a pulse width modulator ("PWM") that supplies the timing for driving the inverter. The current feedback loop includes a phase locked loop ("PLL") which provides a DC output to the PWM proportional to the change in phase of the current sensed at the output of the inverter. The PLL forces the inverter to operate at a frequency where the modulating pulses are initiated at the load current zero crossing. The PLL includes a low pass filter (FIG. 2) and has a suitable low frequency response which allows the PLL to maintain tracking during steady state operation. However, the PLL has a poor high frequency response which prevents the PLL from tracking fast transients that are produced, for example, when a lamp is disconnected or connected. As a result, the PLL may cease tracking, i.e., become unlocked during a lamp change, which can cause loss of zero voltage switching and destruction of the inverter.

U.S. Pat. Nos. 5,075,599 and 4,277,728 both disclose electronic ballasts for driving a single gas discharge lamp with a phase related feedback loop for control. In the '599 patent, correction towards a target phase angle difference (e.g., 0) is made when a minimum reference phase angle difference is greater than the measured phase angle difference (FIG. 5). If the measured phase angle difference is greater than reference phase angle difference, then no correction is made. In the '728 patent, a phase detector (FIGS. 4a and 4b) senses the phase difference between the input to the inverter (push-pull in FIG. 4a and half-bridge in FIG. 4b)

and the voltage across the load. For proper operation, the phase difference should be 90 degrees, indicating that the inverter is operating at the resonant frequency. If the phase difference is not 90 degrees, the phase detector provides an error signal causing the inverter to change frequency towards the resonant frequency. The electronic ballast disclosed in the '728 patent also includes an inductor in the resonant circuit which limits current to the load.

OBJECTS AND SUMMARY OF THE INVENTION

It is an object of the invention disclosed herein to provide an improved electronic ballast for multiple independent lamp operation of a set of gas discharge lamps with a small number of ballast components and without a large input inductor, which operates not only independently of the number of lamps connected to the ballast, whether all connected lamps are operated or not, but also operates to maintain operable connected lamps ignited during a lamp change and to automatically ignite newly connected lamps.

It is another object of the invention to provide an electronic ballast for multiple lamp independent operation with a feedback loop for regulating the power to the lamps which tracks even during a transition period when lamps are removed or added, or ignited or extinguished.

It is another object of the invention to provide an electronic ballast described in connection with any of the above objects of the invention for use with instant start lamps and/or rapid start lamps.

It is another object of the invention to provide a electronic ballast described in connection with any of the above objects of the invention which also provides for dimming operation of rapid start lamps.

The output voltage of a voltage-fed half-bridge parallel resonant inverter with an LC or LLC resonant tank circuit is strongly load dependent. For example, FIG. 1 illustrates the voltage gain ($V_{gain}$) vs. switching frequency (f) relationship of a voltage-fed half-bridge parallel resonant inverter for a load of m lamps, where m is from 1 to 4 lamps and the voltage gain ($V_{gain}$) equals the resonant tank output voltage ($V_o$) provided to the lamp load (R1) divided by the input voltage ($V_{in}$) to the resonant tank circuit, i.e., $V_{gain}=V_o/V_{in}$. The lamp load for the FIG. 1 plots is modeled as a linear resistor R1 in high frequency operation. Thus, frequency control is one way to maintain the output voltage of a resonant inverter constant. However, the inventors determined that with the use of frequency as a direct control variable, constant output voltage of a resonant inverter is difficult to maintain when the number of lamps driven by the ballast changes, as FIG. 1 indicates. Control is made even more difficult because gas discharge lamps may extinguish during a transition period when the number of lamps changes.

In accordance with the invention, the inventors found that the voltage gain of a voltage-fed, half-bridge resonant inverter remains almost constant if the phase angle $\square_{in}$, defined as the phase difference between the voltage $V_{in}$ and the current $I_{LR}$ in the tank circuit (e.g., see FIG. 4) is used as the direct control variable and maintained constant, even during a transition period when a lamp is extinguished, ignited, disconnected or connected. FIG. 2 illustrates the phase angle $\square_{in}$ vs the switching frequency (f) relationship for a lamp load of m (1–4) lamps. FIG. 3 shows the relationship between the voltage gain ($V_{gain}$) and the phase angle ($\square_{in}$) for a lamp load of m (1–4) lamps. The voltage gain curves are merged into a small band, especially in the higher frequency region. This closeness indicates that for a given phase angle $\square_{in}$, the voltage gain is almost independent of the number of lamps. During lamp transitions, if the phase angle $\square_{in}$ is kept fixed or is allowed to change slightly, the output voltage $V_O$ is almost constant. As a result, multiple independent lamp operation can be achieved even during lamp change or lamp operation transitions.

As shown in FIG. 3, the phase angle $\square_{in}$ and the voltage gain $V_{gain}$ are inversely related, with the voltage gain decreasing with increasing phase angle. In accordance with the invention, this relationship is used for dimming operation of a single rapid start lamp or a set of rapid start lamps. Specifically, changing the phase angle in response to a command level signal will dim or brighten a lamp connected to the ballast. The inverse relationship of voltage gain and phase angle plotted in FIG. 3 applies regardless of the number of lamps connected to the ballast. Further in accordance with the invention, the lighting level of one or of a set of rapid start lamps is controlled independently of the number of lamps connected by varying the phase angle.

The invention achieves the above objects by providing an electronic ballast which includes a voltage-fed half-bridge resonant inverter, and control and feedback circuitry coupled to the inverter so as to maintain a substantially constant phase angle between the voltage and the current in an LC or LLC tank circuit, which has the effect of the ballast providing the substantially constant voltage output. The response of the control and feedback circuitry is such that the loop continues tracking when a lamp is extinguished, ignited, disconnected or connected. As mentioned, controlling the inverter to provide an AC output with a constant phase angle has the effect of providing a substantially constant voltage output to the lamps independently of lamp loading. In accordance with a preferred embodiment of the invention, such control and feedback circuitry uses a phase-shift technique that does not employ a phase locked loop.

In a preferred embodiment, the control and feedback circuitry includes a controller and a feedback loop. The feedback loop obtains a current feedback signal and a voltage feedback signal from the tank circuit, and provides a phase shifted signal as a feedback correction signal to the controller. The phase shifted signal, which is the current feedback signal conditioned by the voltage feedback signal, tracks phase angle changes with one, some or all of the lamps of a set thereof connected to the ballast, and during a transition period in which a lamp is ignited, extinguished, disconnected or connected. The feedback loop includes a phase-shift circuit which includes at least one differential amplifier stage that receives the current feedback signal at both inputs and the voltage feedback signal at one input so as to phase shift the current feedback signal and provide the phase-shifted correction signal at the output of the at least one differential amplifier stage. This feedback loop and the controller cause the inverter to provide an AC output with substantially constant phase angle even when a lamp is extinguished, ignited, disconnected or connected. In addition, varying the phase angle in response to a command signal provides for dimming operation of rapid start lamps.

In accordance with a preferred embodiment of the invention, the controller includes a pulse width modulation (PWM) control circuit which receives the phase shift correction signal in the feedback loop and provides drive signals that are coupled to the inverter to provide an output to the lamps with a substantially constant phase angle. The phase-shift circuit in the feedback loop provides the phase shift correction signal to the PWM control circuit in response to the current and voltage sensed in the resonant tank circuit coupled to the output of the inverter.

In the preferred embodiment, the lamps are coupled in parallel to the tank circuit via a transformer, and a small ballast capacitor is coupled in series with each lamp. No inductive ballast components are required.

The electronic ballast may also utilize the feedback loop to sense an overvoltage condition in the tank circuit, in response to which the controller stops operation of the inverter, i.e., stops supplying the inverter with drive signals.

The inventive electronic ballast operates instant start and rapid start lamps with generally the same circuit configuration on the primary side of the output transformer. For rapid start operation, the output transformer secondary includes a portion coupled as a filament heater for each lamp, and the resonant inductor in the tank circuit has secondaries coupled to the filament of each lamp for steady state operation. The feedback loop tracks during lamp warm-up and ignition.

In accordance with embodiments of the invention, the inventive electronic ballast operates multiple lamps in a parallel configuration and in a parallel/series configuration. The inventive electronic ballast may be used in dimming applications for multiple rapid start lamps in various series and parallel lamp configurations.

The invention provides the following advantages:

(1) less circulating current in the electronic ballast which will result in a higher efficiency ballast;

(2) less voltage stresses on the inverter power switches which allows use of lower rated power switches and therefore reduces their cost;

(3) regulation of the lamp current and voltage against line, temperature and circuit parameter variations provided by the feedback loop; and (4) use of the same circuit topology, design method and circuit implementation for multiple lamp independent operation of both instant start and rapid start fluorescent lamps.

BRIEF DESCRIPTION OF THE DRAWINGS

The invention is illustrated in the figures of the accompanying drawings which are meant to be exemplary and not limiting, in which like numerals in the different figures refer to like or corresponding parts, and in which.

DESCRIPTION OF THE PREFERRED EMBODIMENTS

Figure 4:
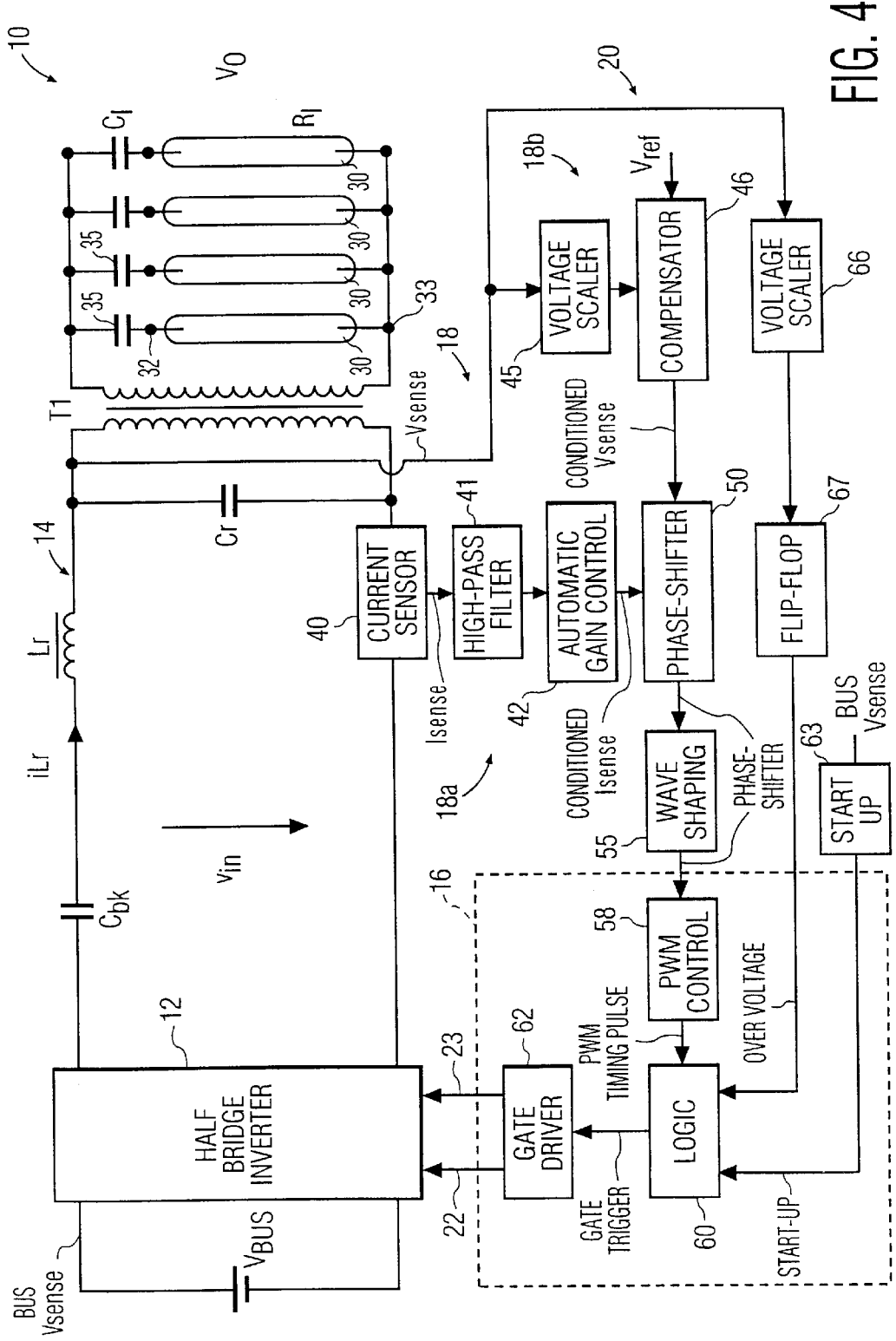
FIG. 4 is a block and schematic circuit diagram of an electronic ballast incorporating the invention.

Referring to FIG. 4, the inventive electronic ballast 10 includes a voltage-fed half-bridge resonant inverter 12, an LC resonant tank circuit 14, and control and feedback circuitry including a controller 16 and a feedback loop 18 to the controller 16. An overvoltage feedback loop 20 is also provided to the controller 16. The feedback loop 18 performs current and voltage sensing, phase shifting and with the controller 16 provides drive signals at 22, 23 to the inverter 12 to maintain the phase angle $\Box_{in}$ constant. The feedback loop 20 performs voltage sensing and operates with the controller 16 to discontinue drive signals to the inverter 12 when an overvoltage condition is sensed.

Still referring to FIG. 4, a DC voltage source Vbus feeds the inverter 12. The LC resonant tank 14, which is coupled to the inverter 12 by a DC blocking capacitor Cbk, includes a resonant inductor Lr and a resonant capacitor Cr. An output isolation transformer Ti couples the resonant tank circuit 14 to multiple, instant start lamps 30. The lamps 30 are coupled to the electronic ballast by connectors, represented schematically by 32 and 33, and collectively present a variable load represented by R1 to the electronic ballast 10. In the embodiment depicted in FIG. 4, the lamps 30 are coupled in parallel through respective ballast capacitors 35, represented collectively by Cl.

With continued reference to FIG. 4, the feedback loop 18 includes a current sense portion 18a comprising a current sensor 40, a high pass filter 41 and an automatic gain control (AGC) circuit 42, and a voltage sense portion 18b comprising a voltage scaler 45 and a voltage compensator 46 circuit. The feedback loop 18 also includes a phase shifter 50 to which is coupled the current and voltage sense portions 18a and 18b.

The current sense portion 18a (FIG. 4) senses the current in the resonant tank circuit 14 (current sensor 40) and provides an Isense signal, passes resonant frequency Isense signals (high pass filter 41), and maintains a suitable signal level (AGC circuit 42) of the high passes Isense signals, which are fed to the phase shifter 50. The voltage sense portion 18b couples the voltage at the output of the tank circuit 14 (Vsense signal) to the voltage scaler 45 which reduces the Vsense voltage to a suitable level and supplies the scaled voltage to a voltage compensator 46 which provides an output voltage to the phase shifter 50 proportional to the difference between the scaled Vsense tank output voltage and a reference voltage ($V_{ref}$).

The conditioned Vsense signal of loop portion 18b provided by compensator 46 is supplied to the phase shifter 50 as a reference signal, and the conditioned Isense signal of the feedback loop portion 18a is provided by the AGC circuit 42 to the phase shifter 50 as the uncorrected phase angle signal. In response to these signals, the phase shifter 50 provides a phase angle correction signal which is generally sinusoidal. The wave shaping circuit 55 converts the sinusoidal signal to square wave and supplies it to the controller 16 as the Phase-Shifted signal.

The controller 16 illustrated in FIG. 4 includes a PWM control circuit 58, logic circuitry 60 and a gate driver 62. The output of wave shaping circuit 55 (Phase-Shifted signal) triggers the PWM control circuit 58 which outputs a PWM timing pulse to logic circuitry 60. Combinatorial logic circuitry 60 couples the PWM timing pulse or a Start-Up signal as a Gate Trigger signal to the gate driver 62, which supplies the drive signals at 22 and 23 to power switches 64 and 65 (FIG. 5) in the inverter 12 to alternately turn them on and off. A start-up circuit 63 is coupled to receive the DC input voltage (BusVsense) to the inverter 12 and provide the Start-Up signal to the logic circuitry 60 for igniting a set of extinguished lamps 30, e.g., when the ballast 10 is first turned on. With this system configuration, the output voltage $V_o$ to the load is regulated to a constant value with from one to four lamps 30 connected, even during the transition periods when a lamp is extinguished or ignited. Such regulation of the ballast output voltage typically leads to a good crest factor of the lamp current.

The overvoltage feedback loop 20 (FIG. 4) includes a voltage scaler 66 coupled to receive the tank output voltage (Vsense signal), and a flip-flop 67 coupled thereto which provides an OverVoltage signal to the logic circuitry 60, which then discontinues Gate Trigger signals to the gate driver circuit 62 to shut down the ballast as long as the overvoltage condition is present.

Figure 5:
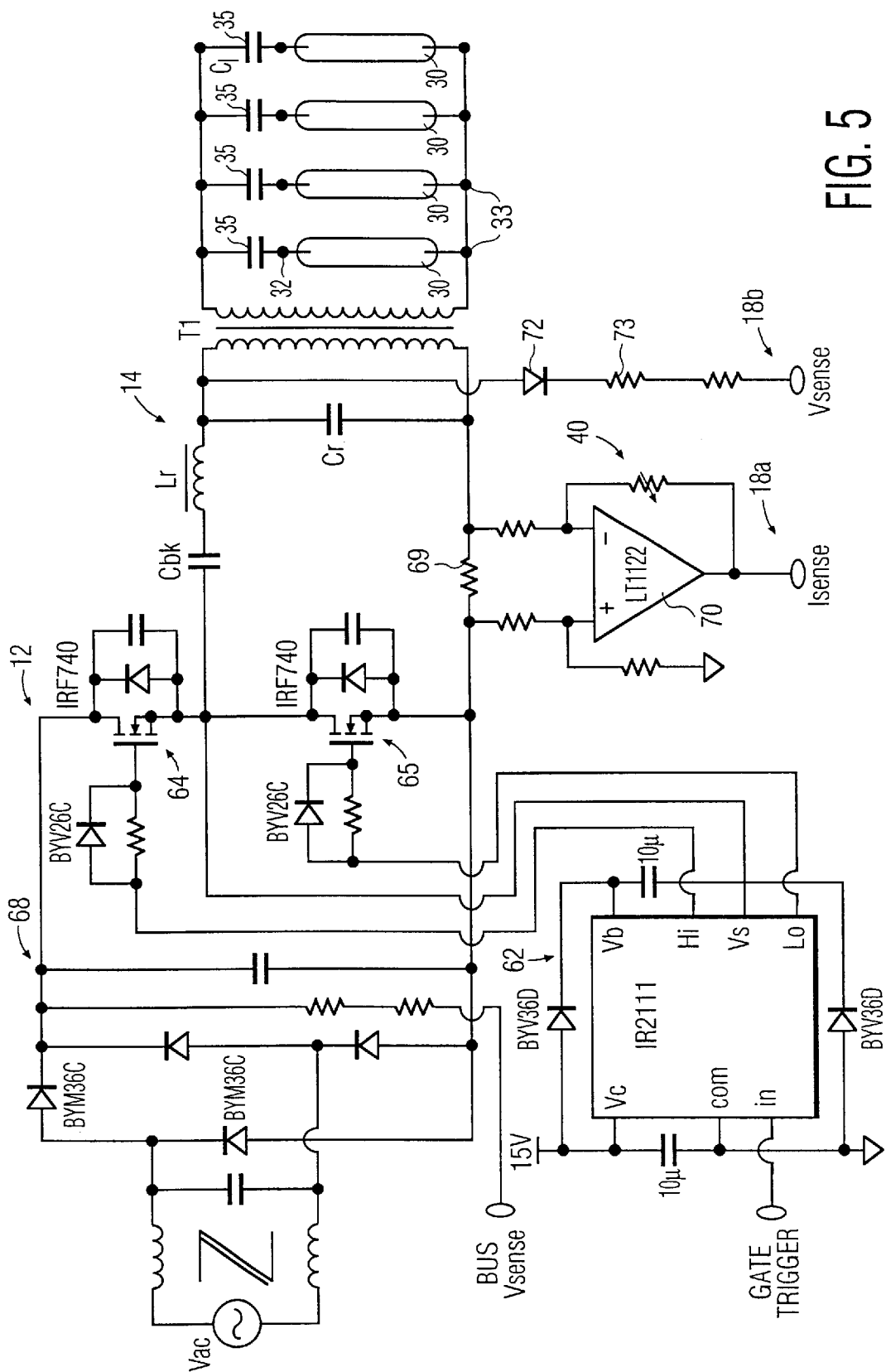
FIGS. 5–8 are schematic circuit diagrams of various circuits represented by the blocks in FIG. 4.
Figure 6:
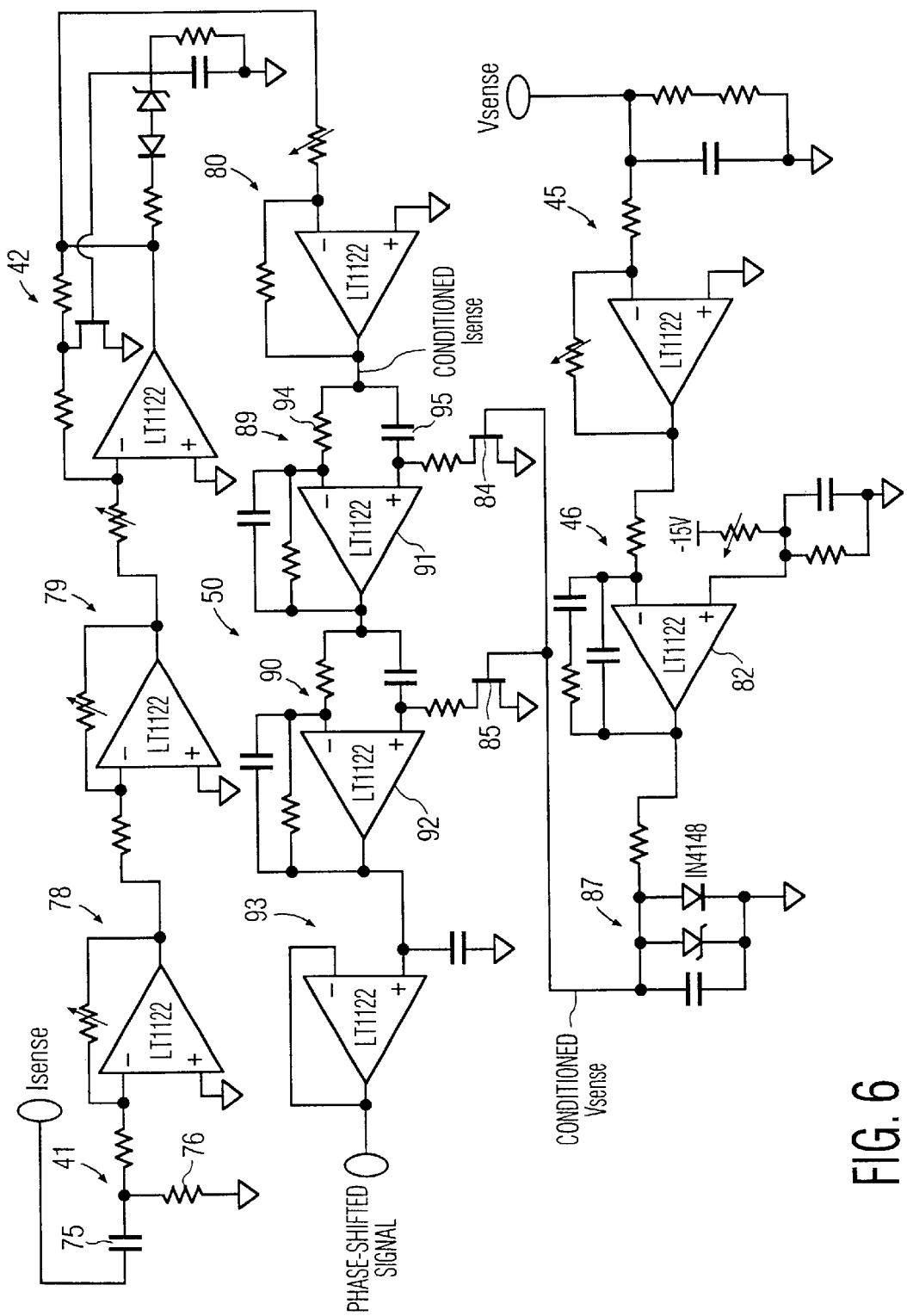

FIG. 5 depicts details of the inverter 12, the gate driver 62, the current sense input to the feedback loop current portion 18a and the voltage sense input to the feedback loop voltage portion 18b. A DC voltage provided by a rectifier circuit 68 coupled to the AC line is supplied to the input to inverter 12. This DC signal, coupled through one or more resistors, is supplied to the start-up circuit 63 (FIGS. 4 and 8) as the Bus Vsense signal. The gate driver 62 may include an International Rectifier IR2111 half-bridge driver. The two power switches 64 and 65 in the inverter 12 provide a square wave output voltage to the tank circuit 14, which provides a sinusoidal voltage at the resonant frequency of the tank circuit to the primary of the transformer T1. The current sensor 40 comprises a resistor 69 connected in series with the return leg of the tank circuit 14 and a differential amplifier 70 coupled across the resistor 69. The output of the differential amplifier 70 provides the Isense signal which is coupled to the high pass filter 41 (FIGS. 4 and 6). (Operation of certain components represented by operational amplifiers in FIGS. 5–8, e.g., differential amplifier 70, buffer stages 78–80 and voltage scalers 45 and 66, are conventional and well known, and therefore a detailed description thereof has been omitted.) The voltage sense loop portion 18b is coupled to the positive output of the tank circuit 14 through a rectifier diode 72 and a current limiting resistor or resistors 73, to provide the Vsense signal which is coupled to the voltage scaler 45 (FIGS. 4 and 6).

Referring to FIG. 6, the high pass filter 41, receiving the Isense signal from FIG. 5 as its input, comprises a series capacitor 75 and a parallel resistor 76. The output of the high pass filter 41 is supplied to the AGC circuit 42 through two buffer stages 78 and 79. The output of the AGC circuit 42 (Conditioned Isense) is supplied to the phase shifter circuit 50 via another buffer stage 80. The Vsense signal from FIG. 5 is fed to the voltage scaler 45, which is coupled to the compensating circuit 46. The compensating circuit 46 includes a differential amplifier 82 which receives the output from the voltage scaler 45 on its inverting input and a reference voltage on its non-inverting input, and provides an output related to the difference between the scaled Vsense voltage and the reference voltage. The output of the compensator differential amplifier 82 is fed to a low pass filter and voltage limiter 87, the output of which (Conditioned Vsense) is fed to two JFET transistors 84, 85 functioning as variable resistors.

The phase shifter 50 (FIG. 6) includes two stages 89, 90, each including a differential amplifier 91, 92. The inverting and non-inverting inputs of the first stage amplifier 91 receive the filtered, gain controlled current sense (Conditioned Isense) signal from buffer stage 80 via a resistor 94 and DC blocking capacitor 95, respectively. The first stage amplifier 91 also receives a variable reference signal from JFET 84 on its non-inverting input which shifts the phase of the conditioned current sense (Condition Isense) signal on the non-inverting input. The amount of shift is determined by the conductivity of the JFET 84, which is controlled by the input signal to its gate terminal provided by the output (Conditioned Vsense) of the compensator circuit 46. The output of the first stage amplifier 91 is proportional to the difference in the filtered, gain controlled current sense (Isense) signal and the shifted (by Conditioned Vsense), filtered, gain controlled current sense signal, where the amount of shift represents the phase difference between the current sense signal Isense and $V_{in}$. The second stage differential amplifier 92 operates like the first stage differential amplifier 91 to provide extended phase shift range of the sensed circuit signal, via a voltage filter stage 93, which is supplied to the wave shaping circuit 55 (FIGS. 4 and 7).

Figure 7:
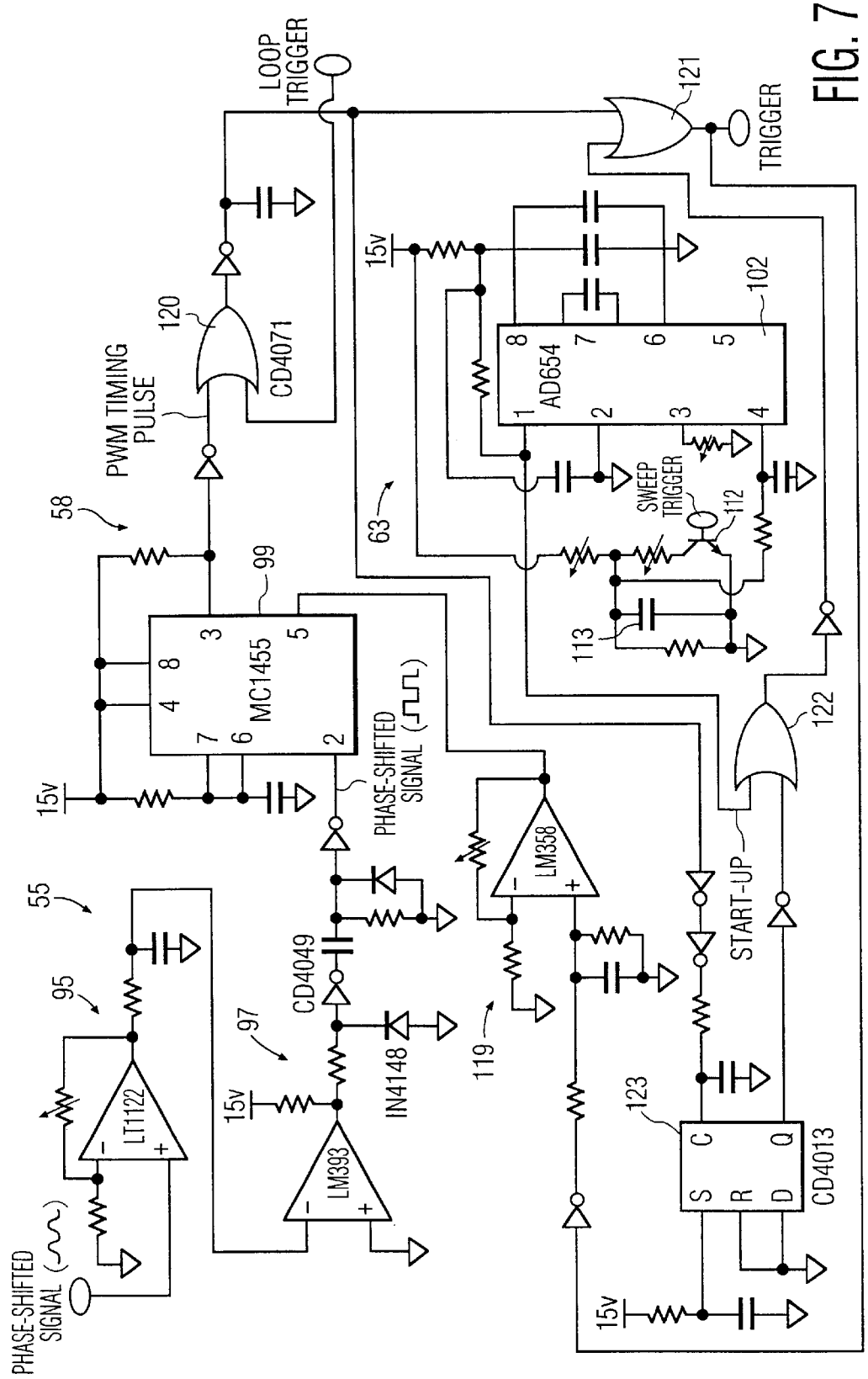

FIG. 7 illustrates the circuit schematic diagram for the wave shaping circuit 55, the PWM control circuit 58, the start-up circuit 63 and part of the logic circuitry 60. The waveshaping circuit 55 includes a voltage buffer stage 95, which receives the Phase-Shifted signal from the voltage filter stage 93 in FIG. 6, and a comparator stage 97 which converts the buffered sinusoidal Phase-Shifted signal into a square wave signal. The PWM control circuit 58 includes a timing circuit 99 (e.g., Motorola MC1455), which receives the square wave Phase-Shifted signal from the comparator stage 97 as a trigger and provides a pulse (PWM Timing Pulse) at its output whose width is related to the Phase-Shifted signal.

Figure 8:
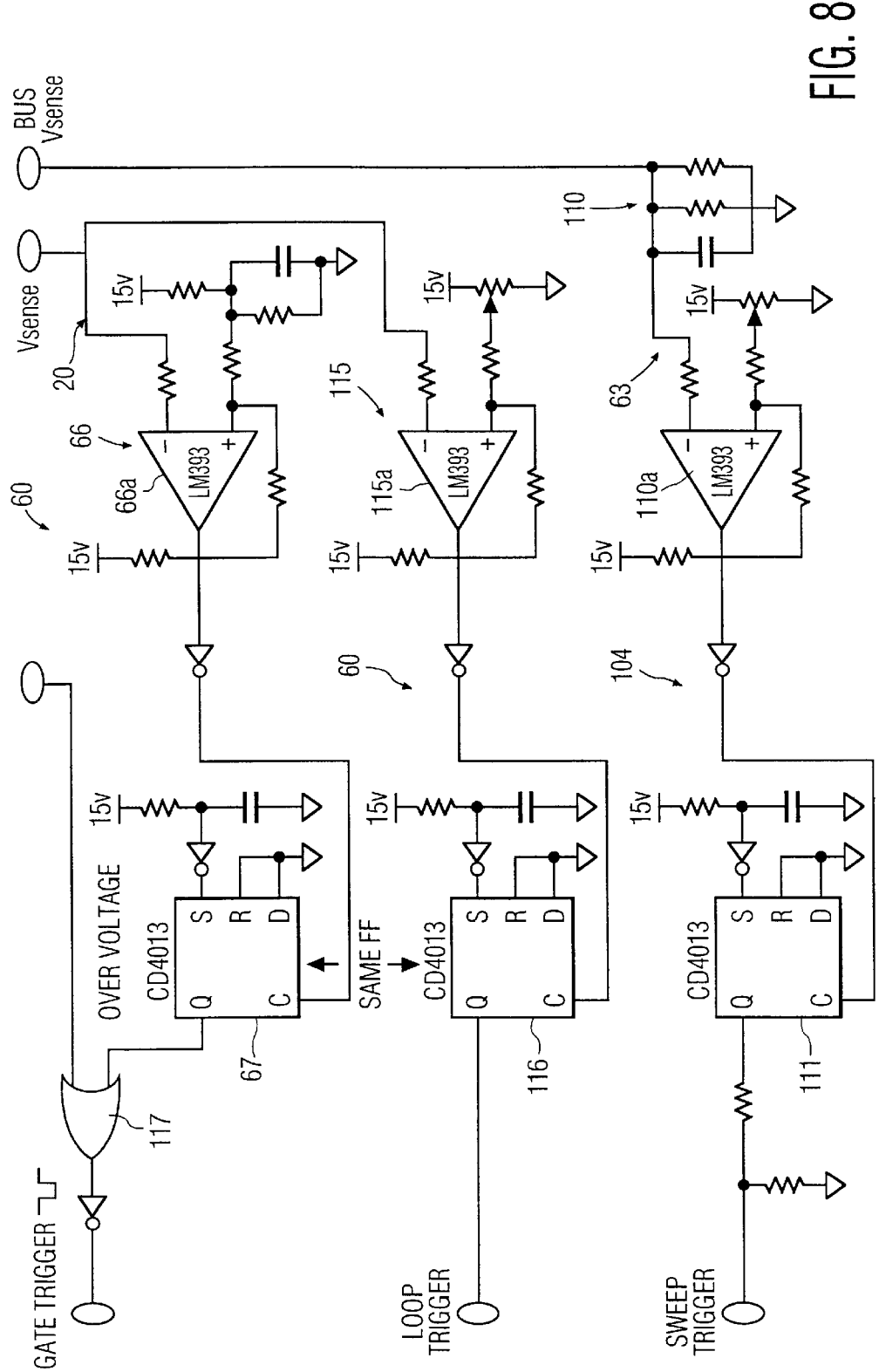

Referring to FIGS. 7 and 8, the start-up circuit 63 includes a voltage-controlled oscillator (VCO) 102 (e.g., AD654 commercially available from known sources) in FIG. 7 and a sweep trigger circuit 104 in FIG. 8 which supplies the Sweep Trigger signal. The sweep trigger circuit 104 (FIG. 8) includes a simple voltage scaler 110, a comparator 110a, and a flip-flop 111. The scaler 110 receives the Bus Vsense signal (FIGS. 4 and 5) from the input to the inverter 12, and provides the Sweep Trigger signal when the Bus Vsense signal exceeds a reference voltage as determined by comparator 110a. The flip-flop 111, clocked by the output of comparator 110a, maintains the Sweep Trigger signal until the Bus Vsense signal reaches the reference voltage coupled to comparator 110a. A minimal Bus Vsense signal is required before any lamp can be ignited. When the Bus Vsense voltage increases and exceeds the minimal required voltage, the Sweep Trigger signal turns transistor 112 (FIG. 7) off and allows capacitor 113 to charge, which creates an increasing ramp or sweep voltage to VCO 102. The width of the Sweep Trigger signal determines the range of frequencies of the signals output by the VCO 102 (pin 1).

The voltage scaler 66 (FIG. 4) and the flip-flop 67 of the overvoltage feedback loop 20 are shown in detail in FIG. 8. The scaler 66 is implemented by a comparator 66a which clocks the flip-flop 67 to supply the OverVoltage signal as described above, i.e., whenever the Vsense signal exceeds the reference voltage to the comparator 66a. The OR gate 117 provides Gate Trigger signals from Trigger signals in the absence of an OverVoltage signal.

Another portion of the logic circuitry 60 in FIG. 8 provides a Loop Trigger signal, and includes a scaler circuit 115, implemented by a comparator 115a, and a flip-flop 116. The flip flop 116 provides the Loop Trigger signal whenever the Vsense signal exceeds a predetermined level, indicating that the lamp output level is proper. The Loop Trigger signal is supplied to OR gate 120 in FIG. 7, which provides a input signal to OR gate 121 if a PWM Timing pulse is present (from timer 118 indicating normal phase-shift controlled operation), or a Loop Trigger signal is present (flip-flop 116 in FIG. 8 indicating that the lamp output voltage is at a proper level). OR gate 121 (FIG. 7) provides the Trigger signal if OR gate 120 provides an output (PWM Timing pulse or Loop Trigger), or if the start-up circuit 63 (FIG. 7) is providing swept frequencies (Start-Up signal) to the OR gate 122 with flip-flop 123 clocked by the output of OR gate 120. The Trigger signal is supplied to switch the ballast from the start-up (frequency sweeping) mode to steady state (Phase-Shift control) mode. The OR gate 117 (FIG. 8) passes a Trigger signal to provide the Gate Trigger signal (low pulse) in the absence of an OverVoltage signal, as discussed above.

FIGS. 4–8 show the ballast 10 configured for instant start lamps 30, which are usually connected in parallel as shown in FIG. 4. With the phase-shift based control provided by the ballast 10 shown in FIGS. 4–8, the ballast 10 generates a constant output voltage $V_O$ (for example 550 V) at all load conditions. In such a way, one or multiple lamp removals will not affect operation of the remaining lamps. When a new lamp or lamps are connected to a set of lamps which form a lighting fixture, the output voltage $V_O$ is applied to the terminals of the lamps and is high enough to ignite the lamps. After ignition, the lamp voltage $V_O$ drops to a lower value (for example 140 V) and the series capacitor Cl performs a ballast function. Again, with the phase-shift based control method described above, the lamp addition process does not have significant effect on the operation of the other lamps in the set.

Figure 9:
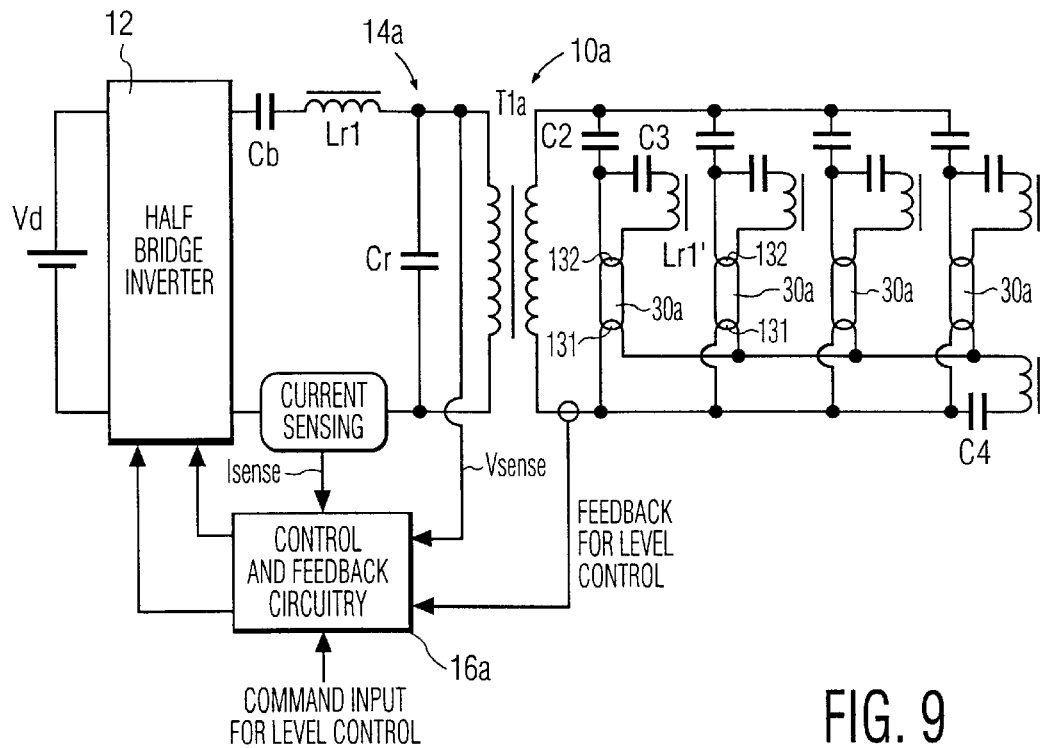
FIGS. 9–11 are simplified block and schematic circuit diagrams of electronic ballast circuits for multiple gas discharge lamp independent operation in rapid start, dimming configurations in accordance with the invention.
Figure 10:
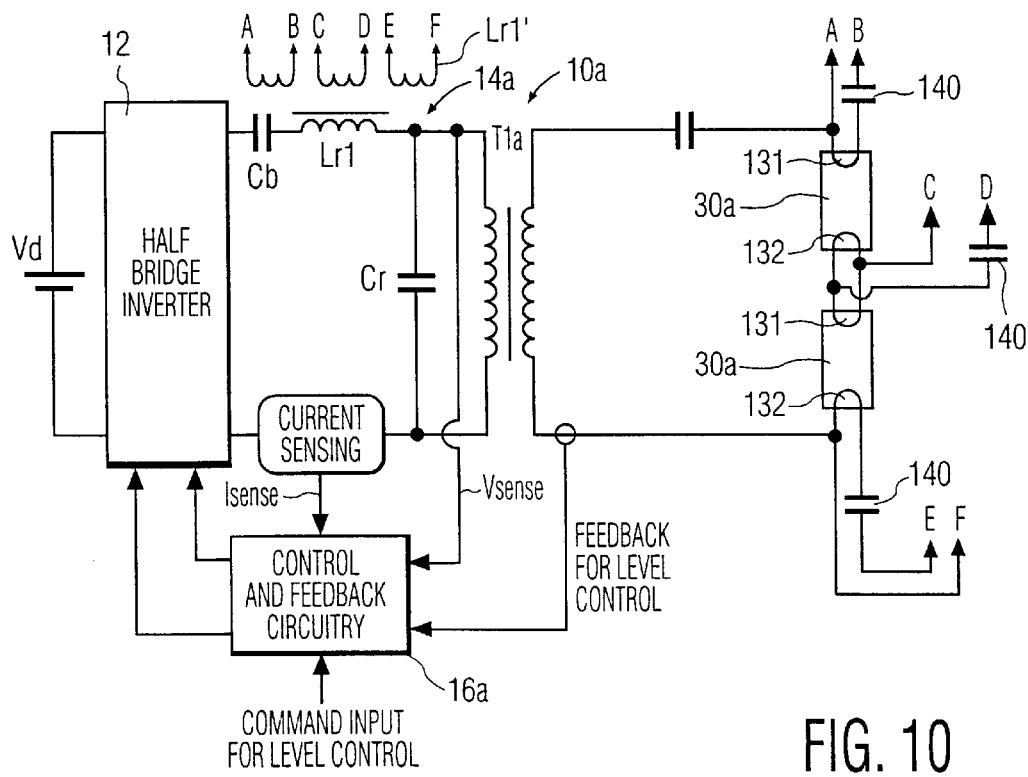
Figure 11:
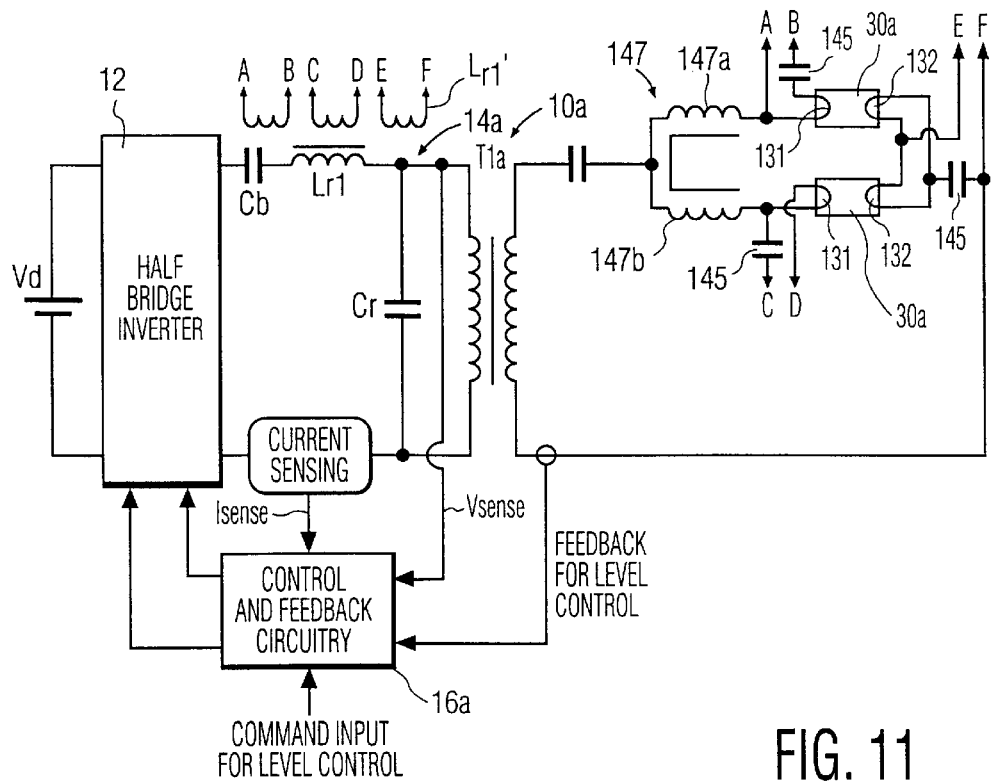
Figure 12:
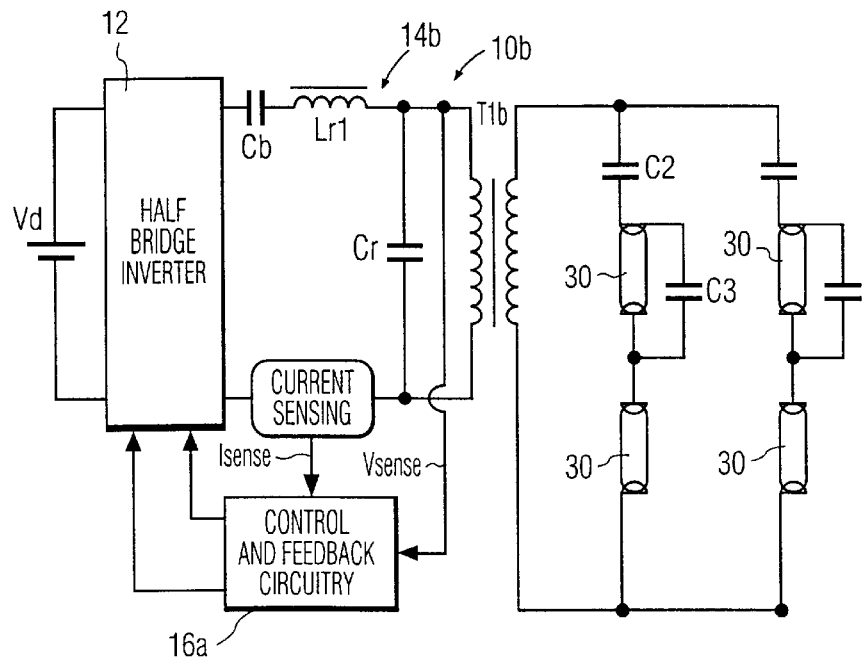
FIG. 12 is simplified block and schematic circuit diagram of an electronic ballast circuit for multiple instant start gas discharge lamp independent operation in a series/parallel configuration of the lamps in accordance with the invention.

The ballast described above can be configured to drive a set of rapid start lamps 30a as shown in FIGS. 9–11, and a set of series/parallel-connected instant start lamps 30 as shown in FIG. 12. In the embodiments of FIGS. 9–11, the ballast 10a on the primary side of the transformer T1a is generally the same as ballast 10, except for the resonant inductor Lr1, which has a number of secondary windings Lr1'; and the controller 16a. In FIGS. 9–12, the current feedback loop portion 18a, the voltage feedback loop portion 18b, the phase shifter 50, the wave shaping circuit 55, the start up circuit 63, the overvoltage loop portion (voltage scaler 66 and flip-flop 67) and the controller 16 are referenced by a single block 16a designated "control and feedback circuitry".

Referring to FIG. 9, the five secondary windings Lr1' are coupled to one terminal of respective filaments 132 and 131 of lamps 30a via respective capacitors C3 and C4 to provide proper filament heating during the start-up process, which is needed to prolong lamp life. The other terminal of each filament is coupled in parallel via a respective ballast capacitor C2.

During lamp preheating of filaments 131 and 132 in FIG. 9, the half-bridge inverter 12 is operated by the controller in the control and feedback circuitry 16a at a higher frequency to produce a small output voltage across the lamps and therefore reduce the glow current. At this point, the resonant tank 14a is designed so that the resonant inductor (Lr1') secondary voltage is kept high. The filaments are heated up with almost constant voltage drop via the series capacitors C3 and C4. After a short period of time (less than 1 second, for example), the operating frequency of the controller 16a is reduced to increase the resonant tank output voltage. When the voltage across the lamps 30a is greater than the ignition voltage, one or more lamps are sequentially ignited. In steady state operation, the controller in the control and feedback circuitry 16a operates at a much lower frequency than that at start-up during the preheat process. Even though the secondary side voltage of Lr1 is increased, the frequency effect dominates the change of the filament current and voltage. As a result, the filament voltage is cut back more than 50% at a full load of four lamps. This in turn reduces the power losses at the filament and increases the ballast efficiency.

FIG. 10 shows the ballast 10a configured to drive a set of two series-connected rapid start lamps 30a. The resonant inductor Lr1 has secondary windings Lr1' respectively coupled via a capacitor 140 to the filaments 131 and the filaments 132 of the lamps 30a. Additional lamps (e.g., three or four) may be connected in series according to the topology depicted in FIG. 10.

FIG. 11 shows the ballast 10a configured to drive a set of two parallel-connected rapid start lamps 30a. The resonant inductor Lr1 has secondary windings Lr1' respectively coupled via a capacitor 145 to the filaments 131 and the filaments 132. An additional inductor 147 may be used in series with each lamp, which can be a single component with windings 147a, 147b on the same core. Additional lamps (e.g., three or four) may be connected in parallel according to the topology depicted in FIG. 11, or in parallel using a balancing choke or chokes.

In the preferred embodiments, the resonant inductor Lr1, the resonant capacitor Cr and the output isolation transformer T1 are the same on the primary side. If the secondaries Lr1' of the resonant inductor Lr1 is not used in LC or LLC resonant instant start operation, then the same power circuit could be used for both instant start and rapid start independent operation. One immediate benefit is the cost savings in production lines.

Figure 1:
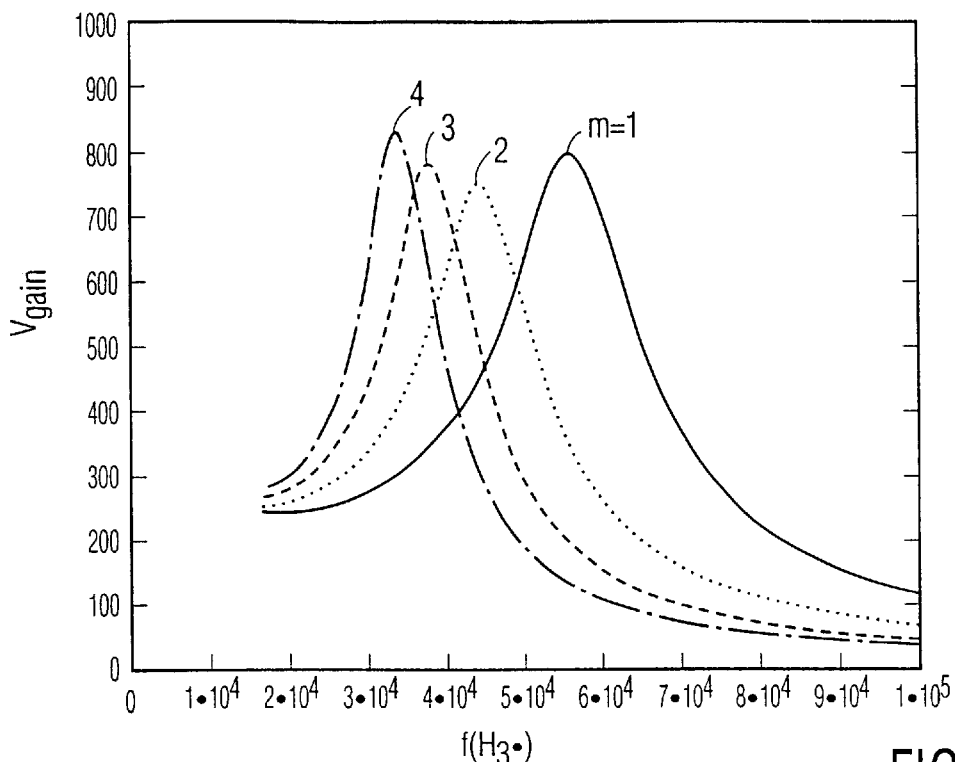
FIG. 1 is a plot of the voltage gain vs. frequency of a voltage-fed, half-bridge resonant inverter in an electronic ballast circuit operating a set of four lamps with one, two, three and four lamps connected.
Figure 2:
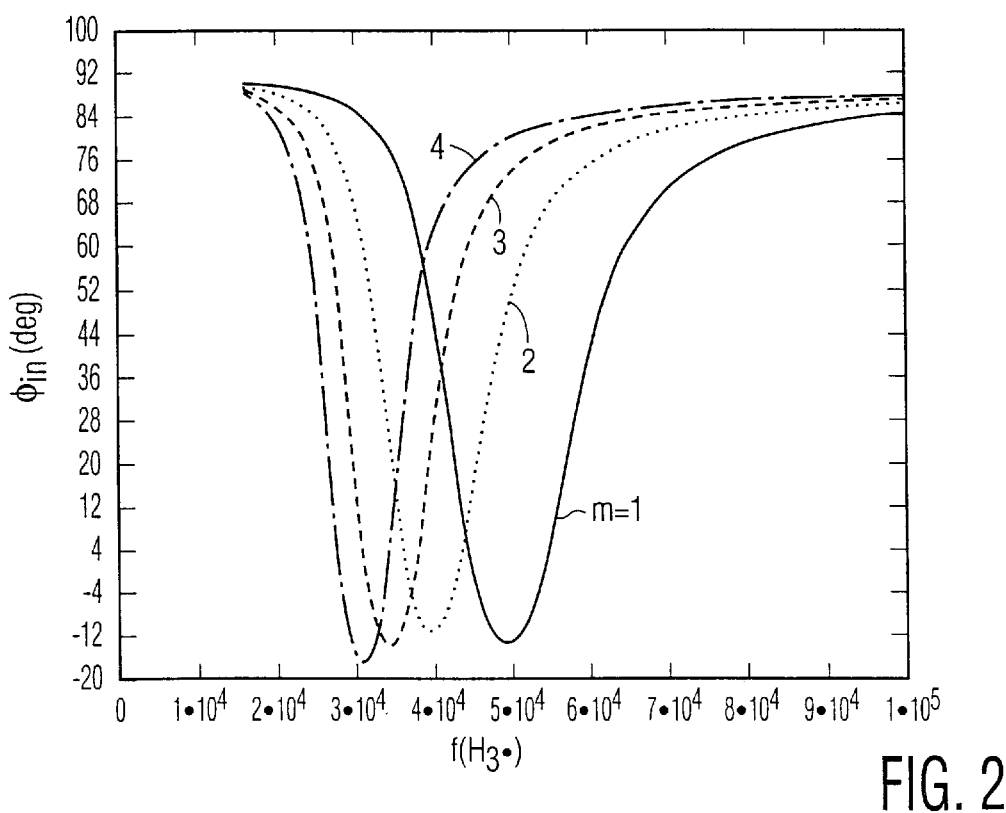
FIG. 2 is a plot of the phase angle vs. frequency of the power supplied to one, two, three and four lamps coupled to a voltage-fed, half-bridge resonant inverter in an electronic ballast circuit.
Figure 3:
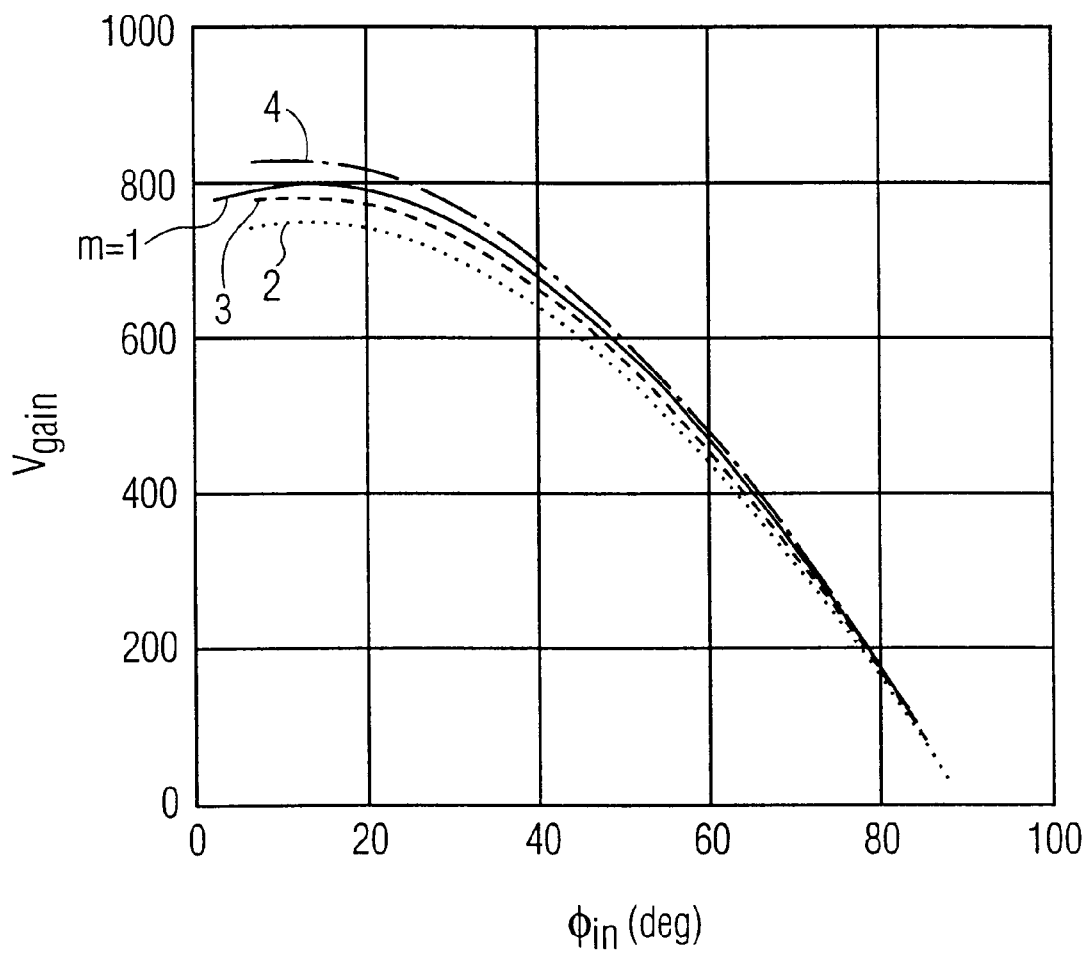
FIG. 3 is a plot of voltage gain vs. phase angle for an electronic ballast operating a set of four lamps with one, two, three and four lamps connected.

As discussed above, control of the phase angle may be used for dimming operation. Increasing the phase angle will reduce the voltage gain (FIG. 3) and dim the rapid start lamps 30a. Dimming operation is possible with the topology of FIGS. 9–11 by providing a command input for level control to the control and feedback circuitry 16a and monitoring the current on the lamp side (secondary) of transformer T1a. In response to the command level input, the control and feedback circuitry 16a increases or decreases the phase angle to decrease or increase, respectively, the gain from a reference supplied by the current feedback from the lamp side of the transformer T1. The phase angle may be adjusted, for example, by adjusting the reference level to the compensator 46 in FIG. 6. The control and feedback circuitry will maintain substantially constant whatever phase angle is set by the signal supplied to the level command input. Thus, the lighting level of the lamps can be adjusted for dimming operation, and the level that is set will be maintained regardless of the input line voltage variations.

In addition to the multiple lamp configurations shown in FIGS. 4 and 9–11, the voltage-fed half-bridge LC or LLC resonant converter with the phase shift based control described herein can be used with a series/parallel configuration of instant start lamps 30 as shown in FIG. 12.

While the invention has been described and illustrated in connection with preferred embodiments, many variations and modifications, as will be apparent to those of skill in the art, may be made without departing from the spirit and scope of the invention. The invention as set forth in the appended clams is thus not limited to the precise details of construction set forth above as such variations and modifications are intended to be included within the spirit and scope of the invention as set forth in the defined claims.

What is claimed is:

1. An electronic ballast for driving one or more gas discharge lamps in a set of discharge lamps, comprising:
   a voltage-fed half-bridge inverter having an input adapted to be coupled to a source of DC voltage, an output, and one or more switching devices which convert DC voltage at the input of the inverter to an AC voltage at the output of the inverter, each switching device having a control input;
   a tank circuit resonant at a given frequency coupled to the output of the inverter, the tank circuit having a tank circuit current flowing therethrough and providing a voltage at an output thereof to ignite operable lamps coupled to the ballast and maintain them lighted;
   a respective ballast device coupled to each lamp;
   control and feedback circuitry including
      a controller having an output coupled to each control input and supplying control signals thereto to control switching of the switching devices and
      a feedback loop coupled from the tank circuit to the controller;
   the control and feedback circuitry being so constructed as to supply control signals to the inverter which cause the inverter to provide an AC output voltage from the tank circuit with substantially constant phase angle between said AC output voltage and the tank circuit current, the feedback loop being operative to track phase angle changes with one, some or all of the lamps of the set connected and during a transition when a lamp is extinguished, ignited, disconnected or connected and supply correction signals to the controller which in response supplies the control signals to the inverter, whereby a substantially constant output voltage can be supplied to the lamp or lamps coupled to the ballast.

2. The ballast as recited in claim 1 wherein the feedback loop includes a voltage feedback loop portion and a current feedback loop portion and a phase shift circuit which provides a phase shifted control signal to the controller in response to a signal related to the current in the tank circuit provided by the current feedback loop portion and a signal related to the voltage at the output of the tank circuit provided by the voltage feedback loop portion.

3. The ballast as recited in claim 2 wherein the controller comprises a pulse width modulation control circuit, the phase-shifted control signal being supplied to the pulse width modulation control circuit.

4. The ballast as recited in claim 3 wherein the phase shift circuit comprises at least one phase-shift stage which includes a differential amplifier having inverting and non-inverting inputs, both of which are coupled to receive the signal related to the current in the tank circuit and one of which is coupled to receive the signal related to the voltage at the output of the tank circuit.

5. The ballast as recited in claim 1 wherein the ballast is adapted to operate instant start lamps and the ballast device comprises a ballast capacitor coupled in series with a respective lamp.

6. The ballast as recited in claim 1 wherein the ballast is adapted to operate rapid start lamps and includes means for heating the filaments of rapid start lamps coupled thereto.

7. The ballast as recited in claim 6 wherein the ballast device comprises a ballast capacitor coupled in series with a respective lamp.

8. The ballast as recited in claim 6 wherein the control and feedback circuitry is coupled to monitor current in the lamps, includes a command input for dimming operation and is responsive to a signal coupled to the command input to change the phase angle and thereby adjust the lighting level of the lamps.

9. The ballast as recited in claim 1 comprising a set of four instant start lamps coupled in parallel with each other and in series with a respective ballast device to the output of the tank circuit.

10. The ballast as recited in claim 1 comprising a set of four instant start lamps, a first pair of which is coupled in series with a ballast device and a second pair of which is coupled in series with another ballast device, the first and second pairs being coupled in parallel to the output of the tank circuit.

11. An electronic ballast for driving one or more gas discharge lamps in a set of discharge lamps, comprising:
   a voltage-fed half-bridge inverter having an input adapted to be coupled to a source of DC voltage, an output, and one or more switching devices which convert DC voltage at the input of the inverter to an AC voltage at the output of the inverter, each switching device having a control input;
   a tank circuit resonant at a given frequency coupled to the output of the inverter, the tank circuit providing a voltage at an output thereof to ignite operable lamps coupled to the ballast and maintain them lighted, the tank circuit including at least one resonant inductor and at least one resonant capacitor;
   a transformer having a primary coupled to the output of the tank circuit and a secondary;
   a ballast device coupled to each lamp;
   control and feedback circuitry including
      a controller having an output coupled to each control input and supplying control signals thereto to control switching of the switching devices and
      a feedback loop coupled from the tank circuit to the controller including a voltage feedback loop portion, a current feedback loop portion and a phase shift circuit which provides a phase shifted control signal to the controller in response to a signal related to the current in the tank circuit provided by the current feedback loop portion and a signal related to the voltage at the output of the tank circuit provided by the voltage feedback loop portion;
   the phase shift circuit tracking phase angle changes with one, some or all of the lamps of the set connected and during a transition when a lamp is extinguished, ignited, disconnected or connected, and the controller being so constructed and cooperating with the feedback loop to supply control signals to the inverter which cause the inverter to provide an AC output with substantially constant phase angle, whereby a substantially constant voltage output is supplied to the lamp or lamps.

12. The ballast as recited in claim 11 wherein the controller comprises a pulse width modulation control circuit, the phase-shifted control signal being supplied to the pulse width modulation control circuit.

13. The ballast as recited in claim 12 wherein the phase shift circuit comprises at least one phase-shift stage which includes a differential amplifier having inverting and non-inverting inputs, both of which are coupled to receive the signal related to the current in the tank circuit and one of which is coupled to receive the signal related to the voltage at the output of the tank circuit.

14. The ballast as recited in claim 11 wherein the ballast is adapted to operate instant start lamps and the ballast device comprises a ballast capacitor coupled in series with a respective lamp.

15. The ballast as recited in claim 11 wherein the ballast is adapted to operate rapid start lamps and the transformer includes a secondary winding adapted to be coupled to a heater filament of each rapid start lamp coupled to the ballast, and wherein the ballast device comprises a ballast capacitor coupled in series with a respective lamp.

16. The ballast as recited in claim 15 wherein the control and feedback circuitry is coupled to monitor current in the lamps, includes a command input for dimming operation and is responsive to a signal coupled to the command input to change the phase angle and thereby adjust the lighting level of the lamps.

17. The ballast as recited in claim 15 wherein the resonant inductor has a set of secondary windings, each being coupled through a capacitor to a respective heater filament of a rapid start lamp coupled to the ballast.

18. A method of regulating an output of an electronic ballast to which a set of gas discharge lamps can be coupled, the ballast operating all, some or one of the lamps of the set coupled thereto, the ballast comprising a voltage-fed resonant inverter, a resonant tank circuit coupled thereto and a controller which operates the inverter; the method comprising the steps of:
    providing a first signal related to the current in the tank circuit;
    providing a second signal related to the voltage at an output of the tank circuit;
    providing a phase shift signal as a feedback correction signal to the controller which is the first signal phase shifted by the second signal which tracks phase angle changes with one, some or all of the lamps of the set connected and during a transition when a lamp is extinguished, ignited, disconnected or connected, whereby the controller causes the output of the electronic ballast to provide a substantially constant voltage output to the lamp or lamps.

19. The method as recited in claim 18 comprising the step of varying the phase shift signal in response to a level command input signal to vary the voltage output to the lamps and thereby provide for dimming operation of the lamps.

20. An electronic ballast for driving at least one rapid start gas discharge lamp at a user selectable lighting level, comprising:
    a voltage-fed half-bridge inverter having an input adapted to be coupled to a source of DC voltage, an output, and one or more switching devices which convert DC voltage at the input of the inverter to an AC voltage at the output of the inverter, each switching device having a control input;
    a tank circuit resonant at a given frequency coupled to the output of the inverter, the tank circuit having a tank circuit current flowing therethrough and providing a voltage at an output thereof to ignite an operable lamp coupled to the ballast and maintain it lighted;
    a ballast device coupled to the at least one lamp;
    control and feedback circuitry including
        a controller having an output coupled to each control input and supplying control signals thereto to control switching of the switching devices;
        a command input for setting the lighting level of the at least one lamp; and
        a feedback loop coupled from the tank circuit to the controller;
    the control and feedback circuitry being so constructed as to supply control signals to the inverter which cause the inverter to provide an AC output voltage from the tank circuit with a substantially constant phase angle between said AC output voltage and the tank circuit current as set by a signal supplied to the command input, the feedback loop being operative to track phase angle changes and supply correction signals to the controller which in response supplies the control signals to the inverter, whereby a substantially constant output voltage can be supplied to the at least one lamp coupled to the ballast in response to the signal supplied to the command input.

* * * * *